US009980107B2

(12) United States Patent
Braun et al.

(10) Patent No.: US 9,980,107 B2
(45) Date of Patent: May 22, 2018

(54) VEHICLE MESSAGING

(71) Applicant: Alcatel Lucent, Boulogne Billancourt (FR)

(72) Inventors: Volker Braun, Stuttgart (DE); Uwe Doetsch, Stuttgart (DE); Andre Fonseca Dos Santos, Den Haag (NL)

(73) Assignee: Alcatel Lucent, Boulogne-Billancourt (FR)

( * ) Notice: Subject to any disclaimer, the term of this patent is extended or adjusted under 35 U.S.C. 154(b) by 0 days. days.

(21) Appl. No.: 15/022,733

(22) PCT Filed: Aug. 7, 2014

(86) PCT No.: PCT/EP2014/066993
§ 371 (c)(1),
(2) Date: Mar. 17, 2016

(87) PCT Pub. No.: WO2015/043813
PCT Pub. Date: Apr. 2, 2015

(65) Prior Publication Data
US 2016/0212601 A1     Jul. 21, 2016

(30) Foreign Application Priority Data
Sep. 25, 2013   (EP) .................................... 13306309

(51) Int. Cl.
*H04W 4/00*     (2018.01)
*H04W 4/20*     (2018.01)
(Continued)

(52) U.S. Cl.
CPC .............. *H04W 4/20* (2013.01); *G08G 1/091* (2013.01); *G08G 1/162* (2013.01); *G08G 1/164* (2013.01);
(Continued)

(58) Field of Classification Search
CPC ........ G08G 1/091; G08G 1/162; G08G 1/164; G08G 1/161; G08G 1/0965;
(Continued)

(56) References Cited

U.S. PATENT DOCUMENTS

| 8,019,533 B2 * | 9/2011 | Mudalige | ............... | G01C 21/26 370/328 |
| 2002/0198660 A1 * | 12/2002 | Lutter | ................... | A01M 31/00 701/300 |

(Continued)

FOREIGN PATENT DOCUMENTS

| CN | 101427287 A | 5/2009 |
| CN | 103125109 A | 5/2013 |

(Continued)

OTHER PUBLICATIONS

International Search Report for PCT/EP2014/066993 dated Nov. 6, 2014.

*Primary Examiner* — Timothy Pham
(74) *Attorney, Agent, or Firm* — Fay Sharpe, LLP

(57) ABSTRACT

A vehicle messaging transmission method, a vehicle messaging transmitter, a vehicle messaging reception method, a vehicle messaging receiver, an infrastructure node method, and infrastructure node and computer program products are disclosed. The vehicle messaging transmission method, comprises: detecting a vehicle event; and transmitting both a vehicle-to-vehicle message over a vehicle-to-vehicle radio link, the vehicle-to-vehicle message identifying the vehicle event and a vehicle-to-infrastructure message over a vehicle-to-infrastructure radio link, the vehicle-to-infrastructure message identifying the vehicle event. In this way, rather than periodically transmitting location messages, instead messages are only transmitted when a particular event occurs. This helps to reduce the volume of messages since the messages are only transmitted when an event occurs.

(Continued)

Also transmitting a vehicle-to-vehicle message enables messages to be transmitted quickly, with reduced latency. Furthermore, because the messages are only sent when an event occurs, privacy and security concerns are reduced. As will be explained in more detail below, transmitting a vehicle-to-vehicle message enables other vehicles which receive the message to receive that message quickly and to respond rapidly to the event, while the vehicle-to-infrastructure message can be used to authenticate the validity of the vehicle-to-vehicle message and provide additional assurance to the receiving vehicle that the message is genuine.

19 Claims, 1 Drawing Sheet

(51) Int. Cl.
| | | |
|---|---|---|
| *G08G 1/16* | (2006.01) | |
| *H04W 12/06* | (2009.01) | |
| *G08G 1/09* | (2006.01) | |
| *H04W 4/02* | (2018.01) | |
| *H04W 72/04* | (2009.01) | |

(52) U.S. Cl.
CPC ............ *H04W 4/027* (2013.01); *H04W 12/06* (2013.01); *H04W 72/042* (2013.01)

(58) Field of Classification Search
CPC ....... G08G 1/096716; G08G 1/096708; G08G 1/096725; G08G 1/096741; G08G 1/0116; G08G 1/166; H04W 12/06; H04W 4/027; H04W 4/20; H04W 72/042
USPC .......................................................... 455/466
See application file for complete search history.

(56) References Cited

U.S. PATENT DOCUMENTS

| | | | |
|---|---|---|---|
| 2004/0061600 A1* | 4/2004 | Wehner | G01S 5/0072 340/435 |
| 2007/0244643 A1* | 10/2007 | Tengler | G08G 1/161 701/301 |
| 2007/0252723 A1* | 11/2007 | Boss | G08G 1/162 340/902 |
| 2008/0266135 A1* | 10/2008 | Curtis | G08G 1/162 340/902 |
| 2009/0128363 A1 | 5/2009 | Wagenhuber et al. | |
| 2009/0189754 A1 | 7/2009 | Hochrein | |
| 2012/0239294 A1 | 9/2012 | Staehlin et al. | |
| 2013/0116915 A1 | 5/2013 | Ferreira et al. | |
| 2013/0120159 A1 | 5/2013 | Staehlin et al. | |
| 2013/0154853 A1* | 6/2013 | Chen | G08G 1/096716 340/905 |
| 2014/0063064 A1* | 3/2014 | Seo | G08G 1/166 345/633 |
| 2015/0326668 A1* | 11/2015 | Mader | H04W 4/12 455/404.1 |
| 2017/0018179 A1* | 1/2017 | Gutierrez | H04L 67/12 |

FOREIGN PATENT DOCUMENTS

| | | |
|---|---|---|
| DE | 10 2007 056 354 A1 | 5/2009 |
| DE | 10 2011 113324 A1 | 3/2012 |
| EP | 1 296 305 A1 | 3/2003 |
| JP | H10-105880 | 4/1996 |
| JP | 2006-195641 | 7/2006 |
| JP | 2012-38258 | 2/2012 |

\* cited by examiner

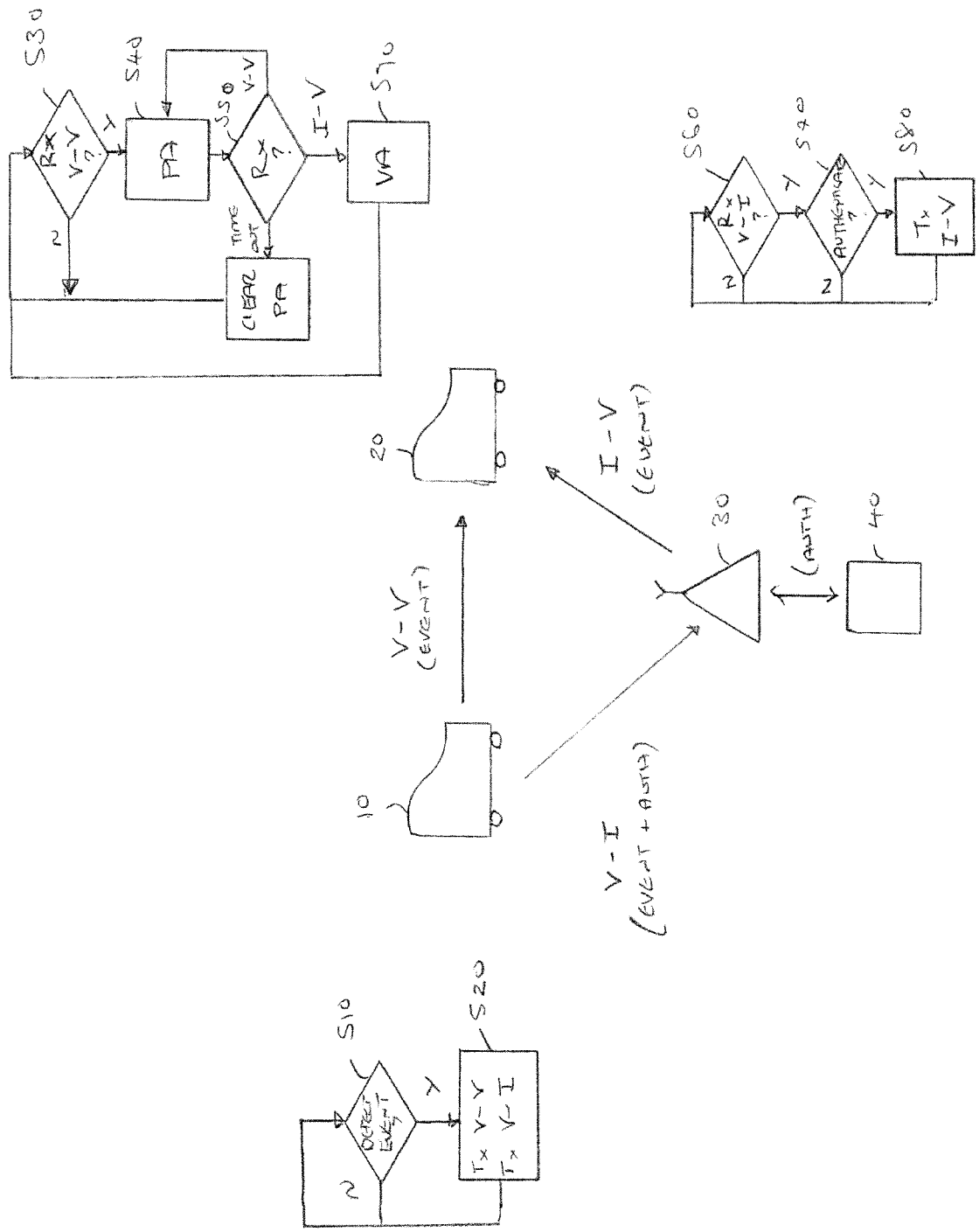

VEHICLE MESSAGING

FIELD OF THE INVENTION

The present invention relates to a vehicle messaging transmission method, a vehicle messaging transmitter, a vehicle messaging reception method, a vehicle messaging receiver, an infrastructure node method, an infrastructure node and computer program products.

BACKGROUND

Vehicle messaging is known. For example, techniques exist which utilize standardized messages for traffic safety. The messages are reported periodically by vehicles which enables a receiver of the messages to reconstruct or to predict events.

Although such vehicle messaging is useful, existing techniques have their drawbacks. Accordingly, it is desired to provide an improved vehicle messaging technique.

SUMMARY

According to a first aspect, there is provided a vehicle messaging transmission method, comprising: detecting a vehicle event; and transmitting both a vehicle-to-vehicle message over a vehicle-to-vehicle radio link, the vehicle-to-vehicle message identifying the vehicle event and a vehicle-to-infrastructure message over a vehicle-to-infrastructure radio link, the vehicle-to-infrastructure message identifying the vehicle event.

The first aspect recognizes that existing solutions have a number of drawbacks. In particular, large traffic volumes may lead to overload of the air or radio interface in dense road scenarios. Also, messages suffer from large average delays and limited reliability, as the messages tend to be large. Furthermore, congestion of the air or radio interface can lead to further delays. In addition, privacy and security concerns arise due to the periodic nature of location reporting.

Accordingly, a method for transmitting vehicle messages is provided. The method may comprise the step of detecting that an event relating to the vehicle has occurred. The method may also comprise the step of transmitting a vehicle-to-vehicle message. The vehicle-to-vehicle message may be transmitted over a vehicle-to-vehicle radio link or air interface. The vehicle-to-vehicle message may identify the vehicle event. The method may also comprise the step of transmitting a vehicle-to-infrastructure message.

The vehicle-to-infrastructure message may be transmitted over a vehicle-to-infrastructure radio link or air interface. The vehicle-to-infrastructure message may also identify the vehicle event. In this way, rather than periodically transmitting location messages, instead messages are only transmitted when a particular event occurs. This helps to reduce the volume of messages since the messages are only transmitted when an event occurs. Also, transmitting a vehicle-to-vehicle message enables messages to be transmitted quickly, with reduced latency. Furthermore, because the messages are only sent when an event occurs, privacy and security concerns are reduced. As will be explained in more detail below, transmitting a vehicle-to-vehicle message enables other vehicles which receive the message to receive that message quickly and to respond rapidly to the event, whilst the vehicle-to-infrastructure message can be used to authenticate the validity of the vehicle-to-vehicle message and provide additional assurance to the receiving vehicle that the message is genuine.

In one embodiment, the step of transmitting comprises transmitting the vehicle-to-infrastructure message over the vehicle-to-infrastructure radio link to a cellular base station. By reusing existing cellular telecommunications network infrastructure, reliable messaging can occur using existing techniques and resources.

In one embodiment, the vehicle-to-infrastructure message comprises authentication information identifying the vehicle. Including authentication information enables the receiving infrastructure node to confirm the authenticity of the messages and to provide a confirmatory message from the infrastructure node to receiving vehicles to assure them that the vehicle-to-vehicle message is genuine.

In one embodiment, the authentication information comprises a key such as, for example, an encryption key.

In one embodiment, at least one of the vehicle-to-vehicle message and the vehicle-to-infrastructure message comprise vehicle telemetry information. Accordingly, either or both of the messages may also include telemetry information, such as vehicle movement information (for example, vehicle position, velocity, direction, orientation, acceleration, operational status, and the like) in order to provide additional information to enable the recipient to decide how to react to the messages and what actions to take.

In one embodiment, the step of transmitting comprises transmitting at least one of the vehicle-to-vehicle message and the vehicle-to-infrastructure message using reserved resources of the vehicle-to-vehicle radio link and the vehicle-to-infrastructure radio link, respectively. By utilizing resources which are reserved for the transmission of such messages, bandwidth availability and limited interference can be assured in order to provide very low latencies and high reliability of messaging.

In one embodiment, the step of detecting comprises detecting a plurality of different vehicle events and transmitting corresponding ones of a plurality of different vehicle-to-vehicle messages and vehicle-to-infrastructure messages. Accordingly, a set of different vehicle events may trigger any one of a set of different corresponding messages. It will be appreciated that it is possible to provide a codebook or look up table of messages which may be defined for use by the vehicles. This enables different events to be easily identified within a small message.

In one embodiment, the method comprises the step of repeating transmitting of at least one of the vehicle-to-vehicle message and the vehicle-to-infrastructure message. Accordingly, the vehicle may repeat transmission of the messages in order to improve the reliability of the message being received by the corresponding receiver.

In one embodiment, the method comprises the step of ceasing transmitting of at least one of the vehicle-to-vehicle message and the vehicle-to-infrastructure message when at least one of an acknowledgement is received and the vehicle event ceases. Accordingly, once an acknowledgment is received confirming that the message has been received by the receiver, then the repeated transmission of the messages may be stopped. Likewise, if the event which precipitated the transmission of the messages is no longer occurring, then the repeated transmission of the messages may be stopped. It will be appreciated that it is also possible to transmit messages confirming that the event has ceased and previous messages relating to that event should be ignored.

In one embodiment, the method comprises the step of deriving timing information for encoding the vehicle-tovehicle message from the infrastructure-to-vehicle radio link. Accordingly, synchronization of the vehicle-to-vehicle messages may be assured by using the infrastructure-to-vehicle radio link which provides for accurate timing information.

According to a second aspect, there is provided a vehicle messaging transmission apparatus, comprising: detection logic operable to detect a vehicle event; and transmission logic operable to transmit both a vehicle-to-vehicle message over a vehicle-to-vehicle radio link, the vehicle-to-vehicle message identifying the vehicle event and a vehicle-to-infrastructure message over a vehicle-to-infrastructure radio link, the vehicle-to-infrastructure message identifying the vehicle event.

In one embodiment, the transmission logic is operable to transmit the vehicle-to-infrastructure message over the vehicle-to-infrastructure radio link to a cellular base station.

In one embodiment, the vehicle-to-infrastructure message comprises authentication information identifying the vehicle.

In one embodiment, the authentication information comprises a key.

In one embodiment, at least one of the vehicle-to-vehicle message and the vehicle-to-infrastructure message comprise vehicle telemetry information.

In one embodiment, the transmission logic is operable to transmit at least one of the vehicle-to-vehicle message and the vehicle-to-infrastructure message using reserved resources of the vehicle-to-vehicle radio link and the vehicle-to-infrastructure radio link, respectively.

In one embodiment, the detection logic is operable to detect a plurality of different vehicle events and the transmission logic is operable to transmit corresponding ones of a plurality of different vehicle-to-vehicle messages and vehicle-to-infrastructure messages.

In one embodiment, the transmission logic is operable to repeat transmission of at least one of the vehicle-to-vehicle message and the vehicle-to-infrastructure message.

In one embodiment, the transmission logic is operable to cease transmission of at least one of the vehicle-to-vehicle message and the vehicle-to-infrastructure message when at least one of an acknowledgement is received and the vehicle event ceases.

In one embodiment, the apparatus comprises deriving logic operable to derive timing information for encoding the vehicle-to-vehicle message from the infrastructure-to-vehicle radio link.

According to a third aspect, there is provided a method for receiving vehicle messaging. The method may comprise the step of receiving a vehicle-to-vehicle message over a vehicle-to-vehicle radio link. The vehicle-to-vehicle message may identify a vehicle event. When the vehicle-to-vehicle message is received, then a preparatory vehicle action may be initiated. The method may also comprise the step of receiving an infrastructure-to-vehicle message over an infrastructure-to-vehicle radio link. The infrastructure-to-vehicle message may identify the vehicle event. When the infrastructure-to-vehicle message is received, then a vehicle action may be initiated. In this way, an action to prepare vehicle may be initiated quickly following the rapid receipt of the vehicle-to-vehicle message. When the infrastructure-to-vehicle message is also received, then it is possible to determine with a high degree of assurance that the vehicle-to-vehicle message was genuine and that the vehicle action should be taken. Accordingly, it can be seen that an initial action can be taken rapidly, but that the final action (which may be more intrusive or severe) is only taken when the network has confirmed that the messages are genuine.

In one embodiment, the preparatory vehicle action prepares the vehicle to reduce a time taken to take the vehicle action. Accordingly, the preparatory vehicle action may affect the operation of the vehicle in preparation for taking another action subsequently or which is intended to help to improve the consequence of an event also occurring to the vehicle receiving the vehicle-to-vehicle message. For example, a preparatory vehicle action may be to prepare brakes, airbags or seatbelts for activation, to begin to slow the vehicle, to prepare to cut the fuel supply or to provide an initial warning of a potential hazard to the driver.

In one embodiment, the method comprises, on receipt of additional vehicle-to-vehicle messages, initiating additional preparatory vehicle actions. Accordingly, when additional, subsequent or further vehicle-to-vehicle messages are received, additional, subsequent or further preparatory vehicle actions are then taken, which correspond to the event indicated within those messages.

In one embodiment, the method comprises, on receipt of a threshold number of additional vehicle-to-vehicle messages from different vehicles, initiating at least one of the vehicle action and the additional preparatory vehicle action. Hence, should a selected number of vehicle-to-vehicle messages be received, then this may indicate that the event is more severe than may at first be expected and so either a vehicle action may be taken as a precautionary measure or additional preparatory vehicle actions may be taken. For example, should a particular vehicle event normally require that the brakes of vehicle are prepared as a preparatory action, if the same event is reported by other vehicle-to-vehicle messages then a further preparatory action (such as actually taking steps to slow the vehicle down) or a vehicle action (such as stopping the vehicle) may be initiated.

In one embodiment, the method comprises, on receipt of a sequence of vehicle-to-vehicle messages, initiating at least one of the additional preparatory vehicle actions and the vehicle action. Hence, should a defined sequence of vehicle-to-vehicle messages be received which indicates with a high degree of confidence that a particular event has occurred, then a particular preparatory vehicle action or a vehicle action may be taken. For example, should a sequence of vehicle-to-vehicle messages indicate that first a hard braking event, then a vehicle stopping event, then an airbag deploying event occurred, then this may cause the receiving vehicle to either slow down as a preparatory action or to also stop as a vehicle action.

In one embodiment, the method comprises ceasing initiation of a preparatory vehicle action when no infrastructure-to-vehicle message is received within a time period. Accordingly, should a vehicle-to-vehicle message not be authenticated by the corresponding infrastructure-to-vehicle message within a defined timeframe, then the preparatory vehicle action may be cancelled or reversed.

In one embodiment, the vehicle action comprises an action to protect at least one of the vehicle and vehicle occupants. It will be appreciated that a wide range of possible actions could be taken to protect the vehicle and/or its occupants, depending on the functionality of the vehicle.

In one embodiment, the infrastructure-to-vehicle message is received over the infrastructure-to-vehicle radio link from a cellular base station. Hence, existing cellular network resources may be used for the transmission of the infrastructure-to-vehicle message. It will be appreciated that this provides reliable and effective coverage.

In one embodiment, the infrastructure-to-vehicle message comprises a cell broadcast message. Accordingly, all vehicles within the cell may receive the infrastructure-to-vehicle message, alerting them to the existence of the event even if they did not receive the vehicle-to-vehicle message. In embodiments, the vehicles may either implement a preparatory vehicle action or a vehicle action in response to receiving just the infrastructure-to-vehicle message. In embodiments, the vehicles may implement only a preparatory vehicle action if they receive just the infrastructure-to-vehicle message.

In one embodiment, the method comprises deriving timing information for decoding the vehicle-to-vehicle message from the infrastructure-to-vehicle radio link.

In one embodiment, the method comprises estimating a relative velocity of a vehicle transmitting the vehicle-to-vehicle message by measuring a Doppler shift when receiving the vehicle-to-vehicle message. Accordingly a relative speed between the vehicles may be determined, which enables the absolute speed of the vehicle transmitting the vehicle-to-vehicle message to be established. This can be used to help influence the degree of any preparatory vehicle action or vehicle action. For example, if it is determined that the velocity of the transmitting vehicle is low, then more urgent breaking may be applied than if the velocity was higher.

In one embodiment, the method comprises the step of receiving an indication of the reserved resources.

According to a fourth aspect, there is provided a vehicle messaging reception apparatus, comprising: reception logic operable, on receipt of a vehicle-to-vehicle message over a vehicle-to-vehicle radio link identifying a vehicle event, to initiate a preparatory vehicle action and, on receipt of an infrastructure-to-vehicle message over an infrastructure-to-vehicle radio link, the infrastructure-to-vehicle message identifying the vehicle event, to initiate a vehicle action.

In one embodiment, the preparatory vehicle action prepares the vehicle to reduce a time taken to take the vehicle action.

In one embodiment, the reception logic is operable, on receipt of additional vehicle-to-vehicle messages, to initiate additional preparatory vehicle actions.

In one embodiment, the reception logic is operable, on receipt of a threshold number of additional vehicle-to-vehicle messages from different vehicles, to initiate at least one of the vehicle action and the additional preparatory vehicle action.

In one embodiment, the reception logic is operable, on receipt of a sequence of vehicle-to-vehicle messages, to initiate at least one of the additional preparatory vehicle actions and the vehicle action.

In one embodiment, the reception logic is operable to cease initiation of a preparatory vehicle action when no infrastructure-to-vehicle message is received within a time period.

In one embodiment, the vehicle action comprises an action to protect at least one of the vehicle and vehicle occupants.

In one embodiment, the infrastructure-to-vehicle message is received over the infrastructure-to-vehicle radio link from a cellular base station.

In one embodiment, the infrastructure-to-vehicle message comprises a cell broadcast message.

In one embodiment, the reception logic is operable to derive timing information for decoding the vehicle-to-vehicle message from the infrastructure-to-vehicle radio link.

In one embodiment, the reception logic is operable to estimate a relative velocity of a vehicle transmitting the vehicle-to-vehicle message by measuring a Doppler shift when receiving the vehicle-to-vehicle message.

In one embodiment, the reception logic is operable to receive an indication of the reserved resources.

According to a fifth aspect, there is provided an infrastructure node method, comprising: receiving a vehicle-to-infrastructure message over a vehicle-to-infrastructure radio link from a vehicle, the vehicle-to-infrastructure message identifying the vehicle event; identifying the vehicle; and when the vehicle is identifiable, transmitting an infrastructure-to-vehicle message identifying the vehicle event over an infrastructure-to-vehicle radio link.

In one embodiment, the step of identifying comprises identifying the vehicle from authentication information in the vehicle-to-infrastructure message. Hence, the infrastructure node may authenticate the integrity of the vehicle transmitting the vehicle-to-infrastructure message.

In one embodiment, step of identifying comprises interrogating another network node to identify the vehicle using the authentication information. Hence, another network node may be contacted to verify the authenticity of the vehicle-to-infrastructure message.

In one embodiment, the authentication information comprises a key.

In one embodiment, the step of transmitting comprises transmitting the infrastructure-to-vehicle message within a cell which received the vehicle-to-infrastructure message.

In one embodiment, the step of transmitting comprises transmitting the infrastructure-to-vehicle message within cells neighbouring the cell which received the vehicle-to-infrastructure message. Accordingly, not only is the infrastructure-to-vehicle message transmitted to vehicles within the cell within which the vehicle-to-infrastructure message was received, but also vehicles in neighbouring cells are alerted to the occurrence of the event.

In one embodiment, the method comprises the step of allocating reserved resources for of at least one of the vehicle-to-vehicle message, the vehicle-to-infrastructure message and the infrastructure-to-vehicle message.

According to a sixth aspect, there is provided an infrastructure node, comprising: reception logic operable to receive a vehicle-to-infrastructure message over a vehicle-to-infrastructure radio link from a vehicle, the vehicle-to-infrastructure message identifying the vehicle event; identification logic operable to identify the vehicle; and transmission logic operable, when the vehicle is identifiable, to transmit an infrastructure-to-vehicle message identifying the vehicle event over an infrastructure-to-vehicle radio link.

In one embodiment, the identification logic is to identify the vehicle from authentication information in the vehicle-to-infrastructure message.

In one embodiment, the identification logic is to interrogate another network node to identify the vehicle using the authentication information.

In one embodiment, the authentication information comprises a key.

In one embodiment, the transmission logic is operable to transmit the infrastructure-to-vehicle message within a cell which received the vehicle-to-infrastructure message.

In one embodiment, the transmission logic is operable to transmit the infrastructure-to-vehicle message within cells neighbouring the cell which received the vehicle-to-infrastructure message.

In one embodiment, the apparatus comprises allocation logic operable to allocate reserved resources for transmission of at least one of the vehicle-to-vehicle message, the vehicle-to-infrastructure message and the infrastructure-to-vehicle message.

According to a seventh aspect, there is provided a computer program product operable, when executed on a computer, to perform the method steps of the first, third or fifth aspects.

According to an eighth aspect, there is provided a vehicle comprising the apparatus of the first aspect. Embodiments of the eighth aspect are provided corresponding to embodiments of the first aspect.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which:

FIG. 1 illustrates the operation of a vehicle message network according to one embodiment.

DESCRIPTION OF THE EMBODIMENTS

Overview

Before discussing the embodiments in any more detail, first an overview will be provided. Embodiments provide a joint vehicle-to-vehicle and vehicle-to-infrastructure transmission scheme to provide good traffic safety support. This arrangement utilizes massive machine communication (MMC) techniques to support traffic safety reporting by providing very low latency communication (typically less than 10 ms), very high reliability, together with good security and authenticity of messaging. By combining vehicle-to-vehicle messaging and vehicle-to-infrastructure messaging an arrangement is possible which provides very low latency traffic safety reporting.

Typically, a set of "n" warning messages may be defined which relate to vehicle events (reported by vehicle sensors) indicative of causing a risk to the vehicle or its occupants, or which indicates that an incident has occurred involving the vehicle or the occupants (such as the occurrence of a traffic jam, persons or objects on the road, seatbelt or airbag being activated, etc.). These warning messages are only transmitted when an event occurs (in an event-driven manner) and not on a regular basis.

One warning message is transmitted identifying the event using a vehicle-to-vehicle link, with very low latency by means of a very reliable physical layer message. Such messaging may utilize simple forward error correction coding (for example by using Repetition Coding) and/or multiple access with simple spreading codes and avoiding encryption coding. By using the vehicle-to-vehicle link, vehicles in proximity to the event which has occurred will be warned of the event with very low latency, although with limited confidence regarding the origin of the warning. These warning messages may be repeated in time to increase transmission reliability.

The sender of the vehicle-to-vehicle message will also transmit concurrently (or shortly thereafter or shortly before) information on a vehicle-to-infrastructure link, informing the network of the event and providing authentication information. The authentication information may be a vehicle identifier. The message contains information about the warning message sent out on the vehicle-to-vehicle link. The vehicle-to-infrastructure link typically uses a more reliable and secure link. For example, the message may use forward error correction coding such as turbo code and encryption coding. Typically, the transmission to the network has a greater latency than the transmission of the physical layer message on the vehicle-to-vehicle link. The network then authenticates or validates the received information and may send out a respective warning message to other vehicles. For example, the network may transmit an infrastructure-to-vehicle message using a cell broadcast message to all vehicles in a certain coverage area and the coverage area may depend on the type or content of the warning message. By using a vehicle-to-infrastructure link, vehicles which are further away from the dangerous event are also warned with increased confidence concerning the origin of the warning, although such a warning incurs a greater degree of latency.

Vehicles that receive the physical layer warning message on the vehicle-to-vehicle link also typically receive, with a small delay, confirmation of the validity of the received vehicle-to-vehicle message. If no confirmation is received from the network within a defined window of time, the received vehicle-to-vehicle warning message may be treated differently, or may even be deleted.

The messages may also include telemetry information such as the vehicle position, velocity, operational status and the like.

Hence, it can be seen that embodiments provide a technique whereby when a vehicle incident occurs, a vehicle-to-vehicle message is transmitted which provides a very fast warning to other vehicles in the vicinity. Those vehicles can then take preparatory action in anticipation of receiving an infrastructure-to-vehicle message confirming that the warning is authentic and that some further action should be taken to protect the vehicle and/or its occupants. The preparatory action typically reduces the time taken for the vehicle action to be performed, thereby improving the probability that the vehicle and/or its occupants will be effectively protected. Once the infrastructure-to-vehicle message is received, then those vehicles which have already received the vehicle-to-vehicle message may perform the vehicle action more quickly than would be possible if no preparatory action had taken place. Other vehicles which receive the infrastructure-to-vehicle message, but which have not yet received the vehicle-to-vehicle message may also take some preparatory action or vehicle action, depending on the nature of the event being reported.

Vehicle-to-Vehicle Link

In a similar manner to existing random access channels used in a cellular wireless telecommunications network, a set of "n" (almost) orthogonal preambles or code words may be defined to represent a corresponding "n" set of warning messages. These messages may map in a predefined way as set out in a standard or be defined in a semi-static manner via firmware updates or via system information broadcasts, etc. On the vehicle-to-vehicle air interface, radio resources are reserved for the transmission of these warning messages. This can be done in a similar manner to a random access channel window used in Long Term Evolution (LTE) networks. To achieve a very low latency, the radio resources can be reserved (for example in each sub frame). If two or more vehicles send out the same preamble number 'n' on the same radio resources concurrently, the receiver should be able to detect the warning message number 'n' with good reliability in the presence of non-perfect timing and frequency synchronization. The timing and synchronization information for a vehicle-to-vehicle link may be derived from the infrastructure-to-vehicle link or from other accurate timing sources such as the global positioning system since using ad hoc time synchronization may increase delays. The vehicle-to-vehicle link may be integrated into the fifth generation (5G) cellular interface, or it may be a standalone link such as that used in IEEE 802.11p in a dedicated spectrum.

As mentioned above, on the vehicle-to-vehicle link, multiple copies of the same warning message may be received, possibly originating from different vehicles. The frequency of occurrence of these warning messages may be used to determine the relevance of the warning message. The receiver may also estimate, using the vehicle-to-vehicle link, the relative velocities using Doppler shift or spread techniques or from telemetry information included in the messages. This also helps to understand the significance of the reported dangerous event.

When a warning message is received on the vehicle-to-vehicle link, the receiver may immediately prepare some safety features of the car such as brakes, airbags, etc. On receipt of a warning message, the on-board unit may or may not immediately inform the driver. In addition, error handling may be provided in case of failure on the vehicle-to-vehicle or vehicle-to-infrastructure links, for example, the messaging reception apparatus may detect the occurrence of a vehicle-to-vehicle message but may not be able to correctly detect the content of this vehicle-to-vehicle message, and in such case the on-board unit may prepare some safety features of the car such as brakes, airbags, etc.

Example Operation

FIG. 1 illustrates a vehicle messaging network according to one embodiment. In this example, vehicles 10, 20 are provided with transceivers for supporting vehicle-to-vehicle communication as well as vehicle-to-infrastructure and infrastructure-to-vehicle communication. Vehicle-to-vehicle communication occurs via a physical layer message. The vehicle-to-infrastructure message occurs on uplink with a cellular base station 30. The infrastructure-to-vehicle messaging occurs through a cell broadcast on a downlink between the cellular base station and the vehicles 10, 20.

In this embodiment, the vehicle 10 experiences an event, as reported by sensors within the vehicle 10. For example, a pressure sensor identifies that pressure is lost from within one of the vehicle's tires. The reported sensor values match one of a set of different events stored by the transceiver for which a warning message should be transmitted. Accordingly, at step S10, the transceiver detects an event and processing proceeds to step S20. At step S20, the transceiver transmits a first vehicle-to-vehicle message over the vehicle-to-vehicle link to other vehicles within the coverage of the vehicle 10. The vehicle-to-vehicle message identifies the event, together with any other telemetry information.

Either simultaneously or shortly thereafter/before, the transceiver also transmits a corresponding first vehicle-to-infrastructure message on the uplink to the cellular base station 30. The vehicle-to-infrastructure message also identifies the event and includes authentication information such as, for example, a key. Optionally, the vehicle-to-infrastructure message may also include vehicle telemetry information (such as the vehicle speed, its orientation, its acceleration and the like).

Thereafter, processing returns to step S10 to await another event.

Meanwhile, at step S30, the vehicle 20 receives the vehicle-to-vehicle message identifying the event.

At step S40, the vehicle 20 takes the appropriate preparatory action identified for when such a message identifying that event is received. In this example, the vehicle 20 prepares the braking system for emergency braking. Thereafter, processing proceeds to step S50 the where the transceiver awaits further messages.

The base station 30 receives the first vehicle-to-infrastructure message at step S60 and interrogates the authentication node 40 to determine whether the message is from an authenticated vehicle.

Meanwhile, the vehicle 10, at step S10 detects another event which is high acceleration caused by the vehicle spinning due to the tire deflating and, at step S20, transmits a further vehicle-to-vehicle message, together with a vehicle-to-infrastructure message identifying this event.

At step S50, the vehicle 20 receives the second vehicle-to-vehicle message and takes further preparatory action at step S40 by reducing the power available to the driver when pressing the accelerator. Processing then proceeds to step S50 to await a further message.

Meanwhile, at step S70, the cellular base station 30 is advised that the first message is authentic and so, at step S80 transmits a first infrastructure-to-vehicle message within at least the cell which received the vehicle-to-infrastructure message. The first infrastructure-to-vehicle message also identifies the event which was reported by the vehicle 10.

The vehicle 20 receives the first infrastructure-to-vehicle message and processing proceeds to step S90 where a vehicle action is taken to activate warning lights to warn other vehicles.

The vehicle 10 undergoes a further event where the vehicle stops and airbags are deployed, this event is then reported at step S20. Again, this is received by vehicle 20 which takes further preventative action, in this case starting to slow the vehicle more rapidly.

In this embodiment, the cellular base station 30 stores an indication that previous messages from this vehicle have been confirmed as being authentic in order to speed the transmission of further infrastructure-to-vehicle messages. Accordingly, second and third infrastructure-to-vehicle messages are transmitted, with the third infrastructure-to-vehicle message also being transmitted within neighbouring cells since the event is identified as being so severe.

The second and third infrastructure-to-vehicle messages are received by the vehicle 20 which then takes further vehicle actions by performing emergency braking and preparing the vehicle for a potential impact.

In embodiments, the messages transmitted by different vehicles are identifiable. For example, multiple spreading codes for the same message may be reserved and a vehicle picks one at random. Likewise, scrambling could be applied using a scrambling sequence out of set of possible scrambling sequences and the scrambling sequence is selected by vehicle at random, where the set of scrambling sequences may be a common set used for all messages, or it may be a message-specific set. Similarly, a message payload is appended by a vehicle identifier or by a cyclic redundancy check (CRC) scrambled with a vehicle identifier (prior to encoding, spreading and/or scrambling). The identifier can be a unique identifier such as, for example, an internet protocol (IP) address. The identifier can be a short random number, for example, 2-16 bits selected by the vehicle at random.

Hence, it can be seen that a sequence of events can occur, each of which causes some preventative action to be taken by vehicles which receive the vehicle-to-vehicle message, prior to some additional action been taken when the corresponding infrastructure-to-vehicle message is received from the network confirming that the vehicle-to-vehicle message is authentic.

It will be appreciated that the preventative action and the vehicle action taken may be varied depending on the number of messages received or whether a defined sequence of messages has occurred.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A vehicle messaging reception method, performed by one or more processors, comprising:
   on receipt of a vehicle-to-vehicle message over a vehicle-to-vehicle radio link identifying a vehicle event, initiating a preparatory vehicle action in preparation for a vehicle action; and
   on receipt of an infrastructure-to-vehicle message over an infrastructure-to-vehicle radio link, said infrastructure-to-vehicle message identifying said vehicle event, initiating said vehicle action.

2. The method of claim 1, wherein said preparatory vehicle action prepares said vehicle to reduce a time taken to take said vehicle action.

3. The method of claim 2, comprising:
   deriving timing information for decoding said vehicle-to-vehicle message from said infrastructure-to-vehicle radio link.

4. The method of claim 1, comprising:
   on receipt of additional vehicle-to-vehicle messages, initiating additional preparatory vehicle actions.

5. The method of claim 4, comprising:
   on receipt of a threshold number of additional vehicle-to-vehicle messages from different vehicles, initiating at least one of the vehicle action and the additional preparatory vehicle action.

6. The method of claim 4, comprising:
   on receipt of a sequence of vehicle-to-vehicle messages, initiating at least one of the additional preparatory vehicle actions and the vehicle action.

7. The method of claim 1, comprising:
   ceasing initiation of a preparatory vehicle action when no infrastructure-to-vehicle message is received within a time period.

8. The method of claim 1, wherein the vehicle action comprises an action to protect at least one of the vehicle and vehicle occupants.

9. The method of claim 1, wherein the infrastructure-to-vehicle message is received over the infrastructure-to-vehicle radio link from a cellular base station.

10. The method of claim 1, wherein the infrastructure-to-vehicle message comprises a cell broadcast message.

11. The method of claim 1, comprising:
    estimating a relative velocity of a vehicle transmitting the vehicle-to-vehicle message by measuring a Doppler shift when receiving the vehicle-to-vehicle message.

12. The method of claim 1, comprising:
    receiving an indication of reserved resources.

13. A computer program product operable, when executed on a computer, to perform the method of claim 1.

14. The method of claim 1, wherein said event is indicative of causing a risk to said vehicle.

15. The method of claim 1, wherein said event is indicative of causing a risk to occupants of said vehicle.

16. The method of claim 1, wherein said event indicates that a traffic jam has occurred.

17. The method of claim 1, wherein said event indicates that there is an object on a road.

18. The method of claim 1, wherein said event indicates that an airbag is being activated.

19. A vehicle messaging reception apparatus, comprising:
reception logic configured to:
- on receipt of a vehicle-to-vehicle message over a vehicle-to-vehicle radio link identifying a vehicle event, initiate a preparatory vehicle action in preparation of a vehicle action, and,
- on receipt of an infrastructure-to-vehicle message over an infrastructure-to-vehicle radio link, said infrastructure-to-vehicle message identifying said vehicle event, initiate said vehicle action.

* * * * *